Figure 1:
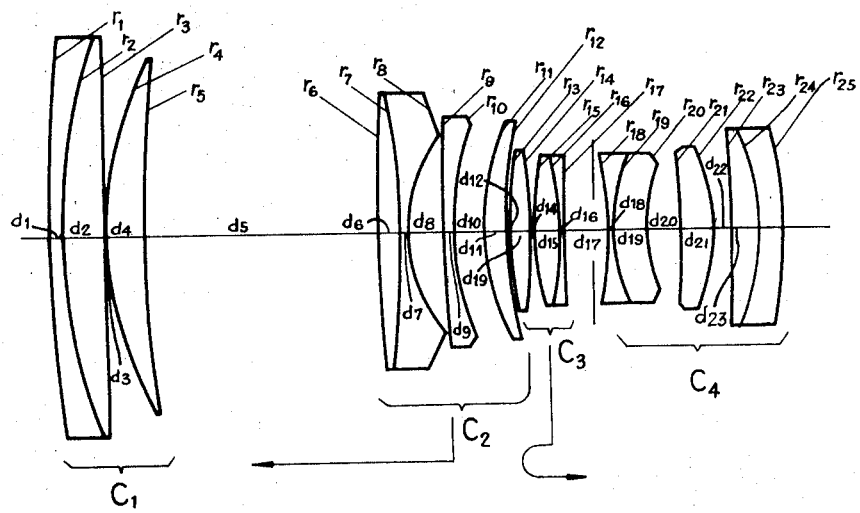

United States Patent

[11] 3,584,935

[72] Inventor Tadashi Kojima
 Tokyo, Japan
[21] Appl. No 828,257
[22] Filed May 27, 1969
[45] Patented June 15, 1971
[73] Assignee Konishiroku Photo Industry Co., Ltd.
[32] Priority June 3, 1968
[33] Japan
[31] 43/37500

[54] IMPROVED WIDE ANGLE ZOOM OBJECTIVE LENS SYSTEM
 1 Claim, 13 Drawing Figs.
[52] U.S. Cl. ................................................. 350/184,
 350/220
[51] Int. Cl. ................................................. G02b 15/14,
 G02b 9/34
[50] Field of Search ................................... 350/184,
 220

[56] References Cited
 UNITED STATES PATENTS
3,027,805 4/1962 Yamaji ........................ 350/184
3,393,958 7/1968 Takano ........................ 350/184 X
3,481,666 12/1969 Higuchi ........................ 350/184
 FOREIGN PATENTS
1,028,353 5/1966 Great Britain ................. 350/184
 419,648 3/1967 Switzerland .................... 350/184
1,095,539 12/1967 Great Britain ................. 350/184

Primary Examiner—David Schonberg
Assistant Examiner—Paul A. Sacher
Attorneys—Harry C. Bierman, Jordan B. Bierman and Bierman and Bierman ABSTRACT: A wide angle zoom objective for all purposes comprising four lens components, of which first three components constitute a variable magnification system and the fourth constitutes a relay system. The second lens component which is movable is chosen negative, while other components are positive. Each of the first to third components includes a cemented lens of same sign as the lens component to which it belongs, and such cemented lens has a cemented surface of refractive power which is of the opposite sign to that of the lens component in which it is included. The focal lengths of the first to third lens components must be within specified range. The first and third components each comprises more than one positive lens group, and the second component includes more than one negative lens group and one positive lens group disposed rearmost from the front of the objective with a relatively large spacing from the negative lens groups thereof. The cemented surfaces in the first and second components are convex and concave, respectively, to the front of the objective. The cemented surfaces in the first to third lens components must have refractive power within specified limits. As to the second component, the spacing between the negative and positive groups, the focal length of the positive lens group and the radius of curvature of foremost surface in the positive group are within specified limits.

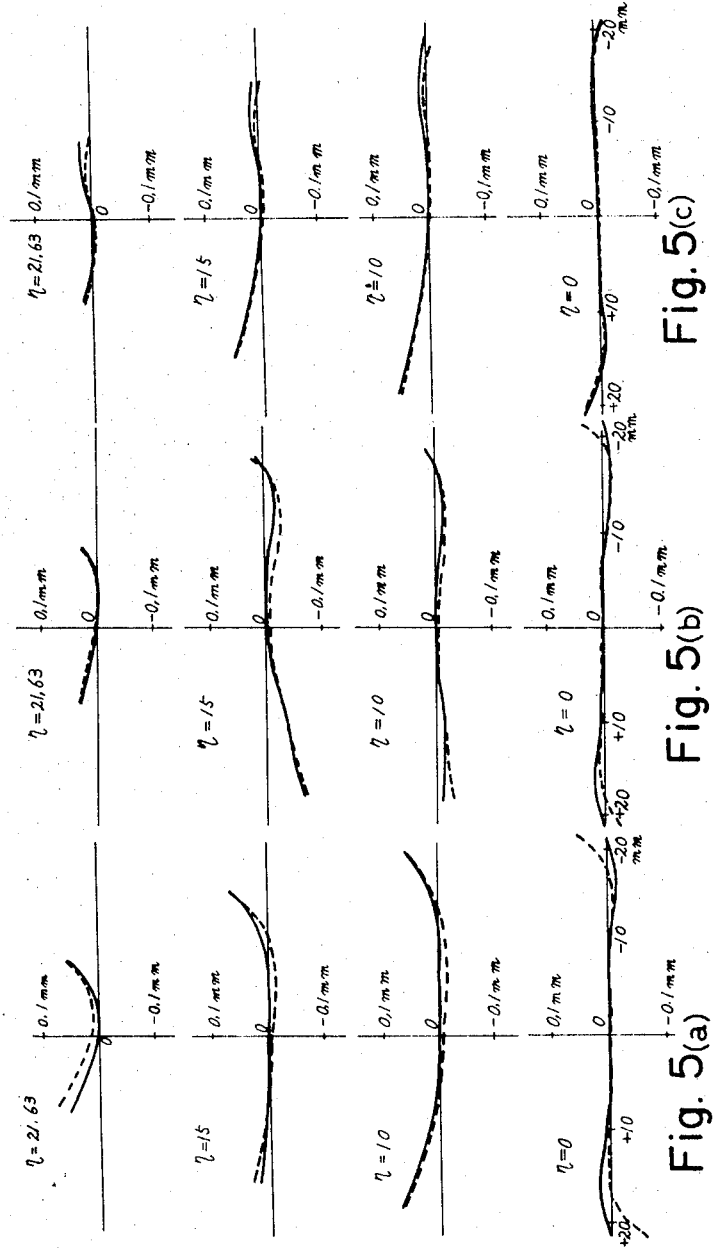

IMPROVED WIDE ANGLE ZOOM OBJECTIVE LENS SYSTEM

The invention relates to a compact zoom objective covering a wide angle region and having a practical value of zoom ratio, which term is defined herein as the ratio of the maximum focal length to the minimum.

Known zoom objectives for a still camera are only exceptionally designed to have a wide angle region at one end of the variable focal range, and the field angle achieved is low. The correction of aberration in such known objectives with a wide angle region is dissatisfactory when compared with interchangeable objectives having comparable focal lengths. In addition, the physical construction is not small enough to be carried by hand for taking pictures.

Therefore, it is an object of the invention to provide an improved zoom objective adapted for all purposes, covering from a wide angle region to longer focal lengths and which provides at its one extremity of variable magnification range as high a field angle as in excess of 60°, having comparable performances to the existing interchangeable objectives of corresponding focal lengths over the entire range of variable magnification, and which is compact enough to be carried by hand to take pictures.

In accordance with the invention, there is provided a wide angle zoom objective comprising four lens components $C_1$ to $C_4$, numbering from the front of the objective, the first to third lens components $C_1$, $C_2$, $C_3$ having positive, negative and positive refractive power, respectively, the first three components $C_1$ to $C_3$ constituting together a variable magnification system and the fourth component $C_4$ constituting a relay system, the second component $C_2$ being movable on an optical axis between the first lens component $C_1$ and the third lens component $C_3$ to vary the focal length of the whole system, the third component $C_3$ being nonlinearly movable over a small extent to keep the final image position of the objective stationary as the second component $C_2$ moves, and wherein denoting the respective focal lengths of the first to third components $C_1$ to $C_3$ by $f_1$, $-f_2$ and $f_3$ and denoting the focal length of the objective at the maximum field angle by $f_s$, the following inequalities apply:

(I)  $0.5 f_s < _2 < 1.5 f_s$
$2.0 f_s < _1 < 4.0 f_2$
$0.8 f_2 < _3 < 1.2 f_2$ wherein (II) the first and third components $C_1$, $C_3$ each include more than one positive lens groups, at least one of the groups each including a positive, cemented lens member having a cemented surface of negative refractive power, and the second lens component $C_2$ includes more than one negative lens groups and one positive lens group disposed rearmost in the second component from the front with a relatively large spacing from the negative lens groups, at least one of the negative lens groups in the second component including a negative, cemented lens member having a cemented surface of positive refractive power, in which denoting the length of the spacing by $t$ which represents the axial separation between the rearmost surface in the negative lens groups and the foremost surface in the positive lens group of the second lens component, and denoting the focal length of the positive lens group in the second component and the radius of curvature of said foremost surface by $f_{2p}$ and $r_{2p}$, respectively, the following inequalities apply:

$0.07 f_2 < < 0.27 f_2$
$2.0 f_2 < _{2p} < 3.0 f_2$
$0.5 f_2 < _{2p} < 1.5 f_2$ and wherein (III) the cemented surface or surfaces in the first component $C_1$ are convex to the front of the objective and the cemented surface or surfaces in the second component $C_2$ are concave to the front, and defining the refractive power, $\Phi_1$ of a cemented surface as $\Phi = (n'-n)/r$ where $n'$ and $n$ are refractive indices across the cemented surface and $r$ is the radius of curvature thereof, and denoting the refractive power of a cemented surface in the first, second and third components $C_1$, $C_2$ and $C_3$ by $\Phi_1$, $\Phi_2$ and $\Phi_3$, respectively, the following inequalities apply:

$0.05/f_1 < -\Phi_1 < 0.30/f_1$
$0.01/f_2 < \Phi_2 < 0.11/f_2$
$0.05/f_3 < -\Phi_3 < 0.20/f_3$

Two major difficulties are encountered when attempting to have a wide angle with a zoom objective. One would be the increase of the diameter of front side lenses as the field angle is increased, because ray of light reaching the marginal part of the field must be allowed to pass through the movable lens group without being prevented its passage through the stop. Such increase of the diameter of front side lenses is objectionable for achieving a compact objective so that it can be held by hand for photographic purpose. This requirement is most severe when the zoom ratio is in the order of 3 to 4 as contemplated in the invention, since for a greater zoom ratio, the general arrangement will assume a larger construction whereby greater dimensions of the front side lenses will be absorbed, while for a lesser zoom ratio, the amount of movement of the movable lenses can be reduced and the front side lenses reduced in size because it is relatively easy to provide the required correction of aberrations for such zoom ratio.

The other difficulty concerns an increasing variation of distortion over the variable magnification range, with the increase of the field angle. The correction to compensate for such variation of distortion is known to be extremely difficult. To give an example, when a zoom objective having focal length from 105 to 300 mm. is modified to a wide angle zoom objective from 35 to 100 mm. by using the same variable magnification system with another relay system, the variation as measured at opposite extremities of the variable magnification range will be $(105/35)^29$ times that of the initial zoom objective, considering the tertiary aberrations. Thus if the initial zoom objective has a variation of 4 percent for distortion, the wide angle system would have a variation of distortion as high as 36 percent.

In order to overcome these difficulties, the invention prevents the increase of the diameter of the front side lenses by the four lens component arrangement and the requirements I mentioned above, which also provide a compact structure. The correction of variation of distortion is met by the requirements II, and the requirements III cater for the correction of change of tertiary aberrations over varying magnification as well as reduction of higher order aberrations caused by the wide angle and compact requirements, or in other words, for the achievement of a balance in the various aberrations.

Specifically, in order to avoid the increase of the diameter of front side lenses, it is essential to use a simple arrangement as permitted by the correction requirements, thereby reducing the distance from the first surface of the objective to the actual stop position. A simple arrangement for this purpose would be a zoom objective which has a variable magnification system comprising a pair of lens components, either positive and negative or negative and positive, as the disposition is considered from the front of the objective. The lens component which lies nearer an object to be photographed is linearly moved and the resulting shift of the final image position is compensated by a small movement of the rear lens component. The total length will be at minimum on the side of minimal focal length in the former disposition, and on the side of maximal focal length in the latter. When it is attempted to construct a compact unit with the former disposition of positive and negative lens components, the correction for curvature of image field will be substantially insufficient on the side of shorter focal lengths as compared with the correction for longer focal lengths, and in addition the ratio of variation of magnification for the given amount of movement of front side lenses will be limited to a relatively low value.

Thus a zoom ratio as contemplated in this invention cannot be achieved without increasing the diameter of front side positive lenses. This applies also when the latter two lens component disposition is used, that is to say, negative first and then positive, even though the total size, front side lens diameter and the correction of aberrations can be satisfactorily maintained within reasonable limits, with a zoom ratio of up to about 2. However, this disposition also fails to provide a satisfactory solution for a zoom ratio of or above 3.

Another possibility would be a variable magnification system which comprises three lens components. A few wide angle zoom objectives are known which include three lens components for the whole system, thus constructed without a relay system. However, such objectives have a field angle less than 56° and is hence only adapted for use with 35 mm. photographic camera having a focal length in excess of 40 mm. A wide angle in excess of 60° cannot be obtained with three lens system because of the extreme difficulty of correcting the variation of aberrations occuring in the variable magnification system, since the respective lens components must have increased refractive power in proportion to the increase of the field angle. Also the correction of residual aberrations would have to be undertaken by the three components, which makes the correction even more difficult. Therefore, the zoom objective according to the invention consists of a variable magnification system comprising three lens components and a relay system comprising a single lens component.

The use of a negative lens component would be desirable for the one nearest an object being viewed or photographed in order to make a wide angle zoom objective. However, this increases the height of incidence of ray upon the movable second lens component which has a major contribution to the variation of magnification, and the resulting increase of aberrations adds further difficulty. Moreover, the attainable ratio of variation of magnification will be less for the same amount of movement of the second lens component than that achieved when the first lens component is positive. Therefore, according to the invention, the first lens component nearest the object is chosen positive, and the second and third lens components are chosen negative and positive, respectively, from the consideration for a compact structure and requirements for correction of aberrations.

The limits defined by the inequality $0.05 f_e < _2 < 1.5 f_e$ in the requirements (I) are fundamental for a wide angle zoom objective arrangement. Above the upper limit, the correction of aberrations will be facilitated, but a large construction will result, thus departing from the purpose of the invention. The lower limit is essential to have a field angle in excess of 60° under the requirements (II) and (III). The inequality $2.0 f_2 < f_1 < 4.0 f_2$ is required together with above given first inequality to provide a compact zoom objective with a zoom ratio on the order of about 3. Above or below the limits given, the intended zoom ratio cannot be achieved or the construction becomes massive. The third inequality $0.8 f_2 < f_3 < 1.2 f_2$ in the requirements (I) maintains as high a zoom ratio as possible for a given total length of movement of the second and third lens components with minimized movement of the third lens component. When the upper limit is exceeded, the amount of movement of the third lens component will increase, while below the lower limit, the correction of variation of higher order aberrations which is caused by the third lens component as the magnification is varied is rendered extremely difficult and in addition extreme machining precision becomes necessary.

The second difficulty mentioned above, that is, the problem of an increasing variation of distortion over the variable magnification range with the increase of the field angle is solved according to the invention by employing a thick lens arrangement for the second lens component in that a positive lens group, thus having a refractive power of opposite sign to that of the refractive power of the whole second component, is positioned at a relatively large distance from negative lens groups contained in this component. Most of known zoom objectives basically adopt substantially thin lens components in which each component comprises two or three lens groups having the same sign as the sign of the refractive power of the respective lens component, with the groups as closely spaced as possible. However, it is found that such a substantially thin lens component arrangement cannot be used for all of the lens components that constitute the variable magnification system when a compact and wide angle zoom objective as contemplated in the present invention is desired. Thus at least one of the first to third lens components which constitute the variable magnification system must be a thick lens arrangement including a lens group having a refractive power of opposite sign to that of the refractive power of said one component. Because of the requirement $0.8 f_2 < f_3 < 1.2 f_2$, the movement of the third lens component in the direction of optical axis is much less as compared with the second lens component, so that its contribution to the correction of variation of aberrations as the magnification is varied would accordingly be low. It is thus seen that the use of a thick lens arrangement for the third lens component would produce little effect and not be advantageous for a compact construction.

The second lens component is chosen as the thick lens component, because its greater refractive power and its long extent of movement designed for major contribution to the variation of magnification will be most advantageous for the intended purpose. In fact, it is found possible to correct the variation of distortion by using a thick lens arrangement for the second lens component alone when the latter which is negative include a positive lens group at a rearmost position in the second lens component with a relatively large spacing from front side lens groups thereof. In accordance with the requirements (II), the second lens component is divided into more than one negative lens groups and a positive lens group disposed at a relatively large spacing from the negative lens groups, and this, in addition to serving the correction of variation of distortion, facilitates correction of variation of tertiary aberrations for varying magnification and serves to minimize the occurrence of higher order aberrations. The inequality, $0.07 f_2 << 0.27 f_2$, for the axial separation between the positive and negative lens groups is an essential requirement to minimize the variation of distortion over the varying magnification. A higher value of $t$ is favorable to the correction of variation of distortion, but is limited because of disadvantages for a compact construction caused above the upper limit and also because of undercorrected higher order spherical aberration that increases sharply at greater focal lengths. Below the lower limit, the effect for the correction of variation of distortion decreases, and the variation of distortion can only be reduced at the expense of an increase of undercorrected tertiary spherical aberration at smaller focal lengths. The requirement represented by the inequality $2.0 f_2 < _{2p} < 3.0 f_2$ most effectively assists the effect of the inequality $0.07 f_2 << 0.27 f_2$ in the correction of variation of distortion. Above the upper limit, the correction of variation of distortion is reduced, and below the lower limit, principally higher order spherical aberration increases, particularly at greater focal lengths. The requirement, $0.5 f_2 < _{2v} < 1.5 f_2$, for the radius of curvature of the foremost surface of the positive lens group is necessary for the correction of variation of distortion under the conditions represented by the foregoing two inequalities. The upper limit is set so as to keep the system effective for the correction of distortion, while when the lower limit is exceeded, an increase of undercorrected higher order spherical aberration results and significant comatic flare is produced by upper ray at a smaller field angle.

When the above requirements under (II) are satisfied, the variation of distortion as the magnification is varied can be corrected, but both of the requirements (I) and (II) cause various higher order aberrations. Without proper correction of variation of higher order aberrations which occurs as the magnification is varied, it is impossible to provide a wide angle zoom objective of high performance as contemplated in the present invention. Basically, in order to minimize higher order aberrations and the variation of tertiary aberrations as the magnification is varied, the second lens component having a negative refractive power is divided into three or more lens groups and both the first and third lens components each having a positive refractive power comprise two or more positive lens groups. Each lens component should have a cemented surface in at least one of its groups, and the cemented surface should have the opposite sign to the sign of the refractive power of the whole lens component to which it belongs. The correction of variation of aberrations must be undertaken principally by the first and second lens components, since as mentioned previously, the movement of the third lens component between its two extreme positions is restricted by the inequality $0.8 f_2 < _3 < 1.2 f_2$ and hence its contribution to correcting the variation of aberrations is small. When the requirements (I) and (II) are imposed for correcting the variation of tertiary aberrations as between the two extremities of the focal length, the refractive power, $\Phi_1$ and $\Phi_2$, of the cemented surfaces in the first and second lens components, respectively, must satisfy the following inequalities which define their lower limits:

$$0.05/f < -\Phi_1 \text{ and } 0.01/f_2 \Phi_2.$$

When the cemented surface which belongs to the first lens component is made convex with respect to an object being viewed or photographed and the following inequality defining the upper limit of $\Phi_1$ is met;

$$-\Phi_1 < 0.30/f_1$$

proper correction is given to overcorrected coma occurring in the marginal part of the image field and which is particularly noted at greater focal lengths. When the cemented surface which belongs to the second lens component is made concave to the object and the value of $_2$ satisfies the upper limit condition defined by the inequality:

$$\Phi_2 < 0.11/f_2,$$

the curvature of image field in the marginal part thereof which is otherwise likely to be undercorrected is well corrected. In order to have aberrations well corrected at an intermediate focal length in the variable range, the third inequality under (III)

$$0.05/f < -\Phi_3 < 0.20/f_3$$

must be satisfied together with the requirements (I) and (II) and the above inequalities for $\Phi_1$ and $\Phi_2$. Below the lower limit, the correction of variation of tertiary aberrations at intermediate focal lengths is rendered impossible, and above the upper limit, appreciable overcorrected comatic flare remains at intermediate focal lengths for upper ray of an intermediate field angle.

The aberrations will be better corrected when the following additional requirements are satisfied:

(IV) the front surface of all of negative lens groups contained in the second lens component is made convex to the object being viewed or photographed, and denoting the radius of curvature of such front surface by $r_{2F}$, it satisfies the following:

$$7 f_2 < |r_{2F}| < \infty, \text{ and}$$

(V) denoting the refractive indices and Abbe numbers across the respective cemented surface in the first to third lens components $C_1$, $C_2$, $C_3$ by $n$, $n'$ and $\nu$, $\nu'$, respectively, these satisfy the following:

for $C_1$ and $C_2$, $$0.05 < n - n' 0.20$$
$$15 < \nu' - \nu a A 40$$

and for $C_3$, when the cemented surface is concave to the object, $$0.05 <' - na0A0.20$$
$$15 < \nu - \nu' 40$$

and when the cemented surface is convex to the object, $$0.05 < -n' 0.20$$
$$15 < \nu' - \nu a A 40.$$

The requirement $7 f_2 < |r_{2F}| < \infty$ under (IV) further contributes to the minimization of the variation of distortion over varying magnification, together with the requirements (II). If it were sufficient to correct distortion only, it would be advantageous to have a smaller value of $r_{2F}$. However, this leads to a large variation of spherical aberration, coma and astigmatism as the magnification is varied, and when $r_{2F}$ exceeds the lower limit and remains positive, the correction of tertiary spherical aberration and tertiary coma at greater focal lengths would be rendered difficult. When the requirements (V) are satisfied, both axial and lateral chromatic aberrations will be well corrected over the entire variable magnification range. The requirements concerning the refractive indices are effective to minimize the variation of tertiary and higher order aberrations over varying magnification when other requirements are satisfied.

In this manner, the invention enables to provide a high performance zoom objective for a still camera, which has as high a field angle as reaching 62° while covering from a wide angle region to longer focal lengths and which is still compact in construction.

Figure 2A:
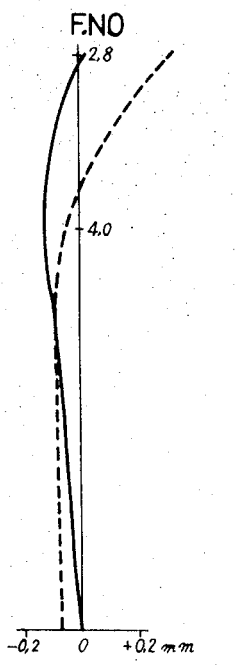
Figure 2B:
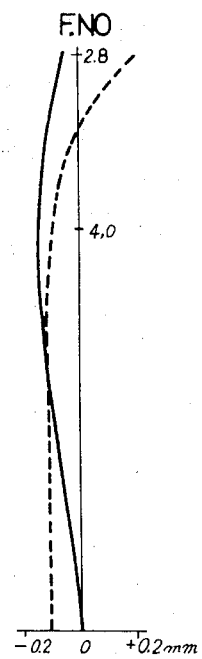
Figure 2C:
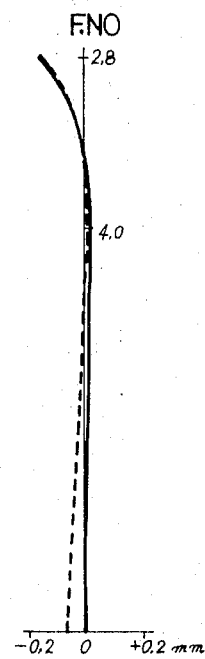
Figure 3A:
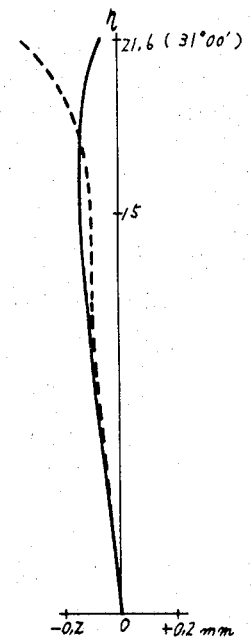
Figure 3B:
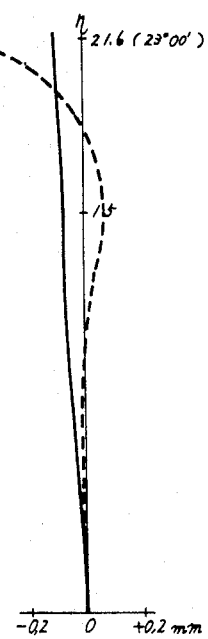
Figure 3C:
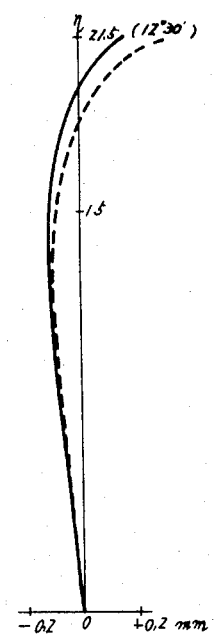
Figure 4A:
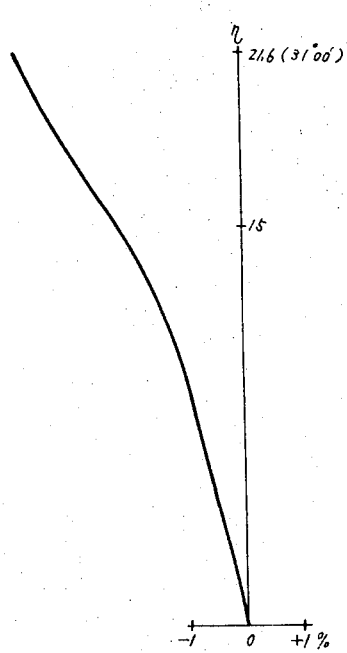
Figure 4B:
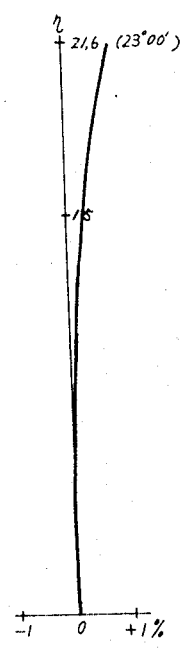
Figure 4C:
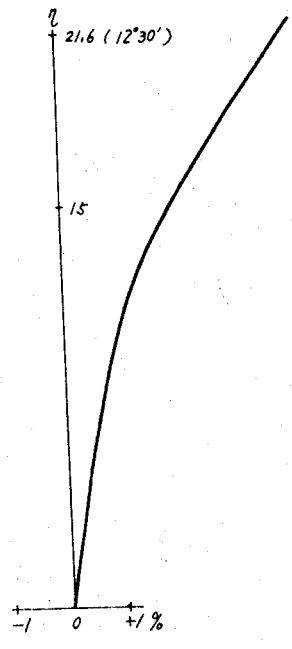

An example of the invention will be described with reference to the drawings in which;

FIG. 1 shows the optical system of an example of the zoom objective according to the invention, FIG. 2 shows the spherical aberration of the example at different focal lengths, FIG. 3 shows the astigmatism, FIG. 4 shows the distortion, and FIG. 5 shows the lateral aberrations including chromatic aberration.

The optical data of the example shown in FIG. 1 is given in the table below, where numbering from the front of the objective facing an object being viewed or photographed, $r_1$, $r_2$.....$r_{25}$ denote radii of curvature of successive refractive surfaces, respectively, $d_1$, $d_2$.....$d_{24}$ denote axial separation between successive refractive surfaces, respectively, $n_1$, $n_2$.....$n_{15}$ denote refractive indices for the $d$-line of glass materials from which successive single lens members are made, respectively, and $\nu_1$, $\nu_2$.....$\nu_{15}$ denote Abbe numbers of the glass materials from which successive single lens members are made, respectively:

[$f$=35.99~100.00 mm.  F1:2.8]

| | | | |
|---|---|---|---|
| $r_1$=266.00 | $d_1$=2.8 | $n_1$=1.80518 | $\nu_1$=25.5 |
| $r_2$=104.50 | $d_2$=7.4 | $n_2$=1.64000 | $\nu_2$=60.2 |
| $r_3$=~ | $d_3$=0.1 | | |
| $r_4$=64.25 | $d_4$=6.5 | $n_3$=1.62041 | $\nu_3$=60.3 |
| $r_5$=191.282 | $d_5$=variable | | |
| $r_6$=501.01 | $d_6$=3.7 | $n_4$=1.80518 | $\nu_4$=25.5 |
| $r_7$=−144.785 | $d_7$=1.5 | $n_5$=1.67003 | $\nu_5$=47.2 |
| $r_8$=26.326 | $d_8$=6.8 | | |
| $r_9$=470.07 | $d_9$=1.5 | $n_6$=1.62041 | $\nu_6$=60.3 |
| $r_{10}$=46.610 | $d_{10}$=5.5 | | |
| $r_{11}$=39.703 | $d_{11}$=3.0 | $n_7$=1.80518 | $\nu_7$=25.5 |
| $r_{12}$=69.777 | $d_{12}$=variable | | |
| $r_{13}$=70.000 | $d_{13}$=3.0 | $n_8$=1.62041 | $\nu_8$=60.3 |
| $r_{14}$=−86.560 | $d_{14}$=0.1 | | |
| $r_{15}$=41.610 | $d_{15}$=5.0 | $n_9$=1.64000 | $\nu_9$=60.2 |
| $r_{16}$=−54.00 | $d_{16}$=0.9 | $n_{10}$=1.80518 | $\nu_{10}$=25.5 |
| $r_{17}$=876.482 | $d_{17}$=variable | | |
| $r_{18}$=−64.08 | $d_{18}$=1.0 | $n_{11}$=1.69680 | $\nu_{11}$=55.6 |
| $r_{19}$=24.08 | $d_{19}$=5.8 | $n_{12}$=1.71736 | $\nu_{12}$=29.5 |
| $r_{20}$=38.585 | $d_{20}$=5.0 | | |
| $r_{21}$=−122.50 | $d_{21}$=5.0 | $n_{13}$=1.80610 | $\nu_{13}$=41.0 |
| $r_{22}$=−38.250 | $d_{22}$=4.2 | | |
| $r_{23}$=~ | $d_{23}$=8.0 | $n_{14}$=1.75500 | $\nu_{14}$=52.4 |
| $r_{24}$=−23.77 | $d_{24}$=1.5 | $n_{15}$=1.75520 | $\nu_{15}$=27.5 |
| $r_{25}$=−83.107 | | | | wherein $d_5$, $d_{12}$, and $d_{17}$ assume the following values depending upon the focal length, $f$;

| $f$ | $d_5$ | $d_{12}$ | $d_{17}$ |
|---|---|---|---|
| 35.992 | 2.246 | 45.122 | 4.194 |
| 50.991 | 16.246 | 28.854 | 6.462 |
| 100.000 | 42.246 | 0.903 | 8.413 |

The focal lengths of the first to third components are as follows $f_1 = 126.000$
$-f_2 = -40.000$
$f_3 = 36.364$ In FIGS. 2 to 5, which show spherical aberration, astigmatism, distortion and lateral aberration including lateral chromatic aberration of the wide angle zoom objective according to the example, each graph or set of graphs accompanying small letters $a$, $b$ or $c$ corresponds to a focal length of 35.992 mm., 50.991 mm. or 100 mm., respectively. In FIGS. 2 and 5, curves drawn in solid lines represent aberrations for the $d$-line and curves in broken lines represent those for the $g$-line. FIG. 3 shows curvature of image field in the sagittal plane by solid lines and curvature of image field in the meridional plane by broken lines. The denotation $\eta$ in FIG. 5 indicates an image height at the stop position which is chosen at 3.694 mm. forwardly of the foremost surface in the fourth component. It will be noted that various aberrations are well corrected for different focal lengths.

What I claim is:
1. Wide angle zoom objective of which optical construction data is given by the table below wherein numbering from the front of the objective facing an object being viewed,
   $r_1, r_2 \ldots r_{25}$ denote radii of curvature of successive refractive surfaces, respectively,
   $d_1, d_2 \ldots d_{24}$ denote axial separation between successive refractive surfaces, respectively,
   $n_1, n_2 \ldots n_{15}$ denote refractive indices for the $d$-line of glass materials from which successive single lens members are made, respectively, and
   $\nu_1, \nu_2 \ldots \nu_{15}$ denote Abbe numbers of the glass materials from which successive single lens members are made, respectively.

The focal lengths of the first to third components are as follows:

$f_1 = 126.000$
$-f_2 = -40.000$
$f_3 = 36.364$

[$f = 35.99 \sim 100.00$ mm. F1:2.8]

| | | | |
|---|---|---|---|
| $r_1 = 266.00$ | $d_1 = 2.8$ | $n_1 = 1.80518$ | $\nu_1 = 25.5$ |
| $r_2 = 104.50$ | $d_2 = 7.4$ | $n_2 = 1.64000$ | $\nu_2 = 60.2$ |
| $r_3 = \infty$ | $d_3 = 0.1$ | | |
| $r_4 = 64.25$ | $d_4 = 6.5$ | $n_3 = 1.62041$ | $\nu_3 = 60.3$ |
| $r_5 = 191.282$ | $d_5 = $ variable | | |
| $r_6 = 501.01$ | $d_6 = 3.7$ | $n_4 = 1.80518$ | $\nu_4 = 25.5$ |
| $r_7 = -144.785$ | $d_7 = 1.5$ | $n_5 = 1.67003$ | $\nu_5 = 47.2$ |
| $r_8 = 26.326$ | $d_8 = 6.8$ | | |
| $r_9 = 470.07$ | $d_9 = 1.5$ | $n_6 = 1.62041$ | $\nu_6 = 60.3$ |
| $r_{10} = 46.610$ | $d_{10} = 5.5$ | | |
| $r_{11} = 39.703$ | $d_{11} = 3.0$ | $n_7 = 1.80518$ | $\nu_7 = 25.5$ |
| $r_{12} = 69.777$ | $d_{12} = $ variable | | |
| $r_{13} = 70.000$ | $d_{13} = 3.0$ | $n_8 = 1.62041$ | $\nu_8 = 60.3$ |
| $r_{14} = -86.560$ | $d_{14} = 0.1$ | | |
| $r_{15} = 41.610$ | $d_{15} = 5.0$ | $n_9 = 1.64000$ | $\nu_9 = 60.2$ |
| $r_{16} = -54.00$ | $d_{16} = 0.9$ | $n_{10} = 1.80518$ | $\nu_{10} = 25.5$ |
| $r_{17} = 876.482$ | $d_{17} = $ variable | | |
| $r_{18} = -64.08$ | $d_{18} = 1.0$ | $n_{11} = 1.69680$ | $\nu_{11} = 55.6$ |
| $r_{19} = 24.08$ | $d_{19} = 5.8$ | $n_{12} = 1.71736$ | $\nu_{12} = 29.5$ |
| $r_{20} = 38.585$ | $d_{20} = 5.0$ | | |
| $r_{21} = -122.50$ | $d_{21} = 5.0$ | $n_{13} = 1.80610$ | $\nu_{13} = 41.0$ |
| $r_{22} = -38.250$ | $d_{22} = 4.2$ | | |
| $r_{23} = \infty$ | $d_{23} = 8.0$ | $n_{14} = 1.75500$ | $\nu_{14} = 52.4$ |
| $r_{24} = -23.77$ | $d_{24} = 1.5$ | $n_{15} = 1.75520$ | $\nu_{15} = 27.5$ |
| $r_{25} = -83.107$ | | | | wherein $d_5$, $d_{12}$ and $d_{17}$ assume the following values depending upon the focal length, $f$:

| $f$ | $d_5$ | $d_{12}$ | $d_{17}$ |
|---|---|---|---|
| 35.992 | 2.246 | 45.122 | 4.194 |
| 50.991 | 16.246 | 28.854 | 6.462 |
| 100.000 | 42.246 | 0.903 | 8.413 |